United States Patent [19]

Abernethy et al.

[11] 4,095,420
[45] Jun. 20, 1978

[54] AUGMENTOR OUTER SEGMENT LOCKOUT AND FAN UPMATCH

[75] Inventors: Robert B. Abernethy; Edmond Preti; John P. Rembold, all of North Palm Beach, Fla.

[73] Assignee: The United States of America as represented by the Secretary of the Air Force, Washington, D.C.

[21] Appl. No.: 791,077

[22] Filed: Apr. 26, 1977

[51] Int. Cl.² .............................................. F02K 3/10
[52] U.S. Cl. ...................................... 60/204; 60/236; 60/241; 60/226 R
[58] Field of Search ................ 60/204, 235, 236, 241, 60/242, 226 R, 261

[56] References Cited

U.S. PATENT DOCUMENTS

| 3,331,204 | 7/1967 | Love | 60/241 |
| 3,360,940 | 1/1968 | Rimmer | 60/241 |
| 3,472,027 | 10/1969 | Snow | 60/236 |
| 3,854,287 | 12/1974 | Rembold | 60/239 |

*Primary Examiner*—Clarence R. Gordon
*Attorney, Agent, or Firm*—Joseph E. Rusz; Richard J. Killoren

[57] ABSTRACT

A thrust augmented twin spool turbofan engine system to control instability at high altitude, low Mach number conditions wherein an engine electronic control monitors engine inlet temperature, engine burner pressure and Mach number, and inhibits fuel flow to the outermost augmentor segment when the engine inlet temp drops below 25° F, when engine burner pressure drops below 120 psia or when the Mach number drops below 0.4. When fuel flow to the outermost augmentor is inhibited, upmatch logic modifies the variable nozzle AJ trim signal closed 8% and the power level angle trim signal up 4°.

4 Claims, 5 Drawing Figures

4,095,420

AUGMENTOR OUTER SEGMENT LOCKOUT AND FAN UPMATCH

RIGHTS OF THE GOVERNMENT

The invention described herein may be manufactured and used by or for the Government of the United States for all governmental purposes without the payment of any royalty.

BACKGROUND OF THE INVENTION

This invention relates to a control system for an augmented or afterburning turbofan engine which operates with three to five segments or zoned augmentors.

With improvements in turbine engines, particularly those used to power aircraft, complex control systems are required to maintain the numerous engine components and operating parameters within operational limits. Numerous control systems, both hydromechanical and electrical, have been developed which adequately fulfill the requirements of modern aircraft turbine engines.

The patents, Hutchinson et al, U.S. Pat. Nos. 3,688,504; Rembold, 3,854,287; and Harner et al, 3,932,058, show such control systems.

While operating with all of the segments, augmentor rumble or instability occurs at high altitudes, low Mach number conditions.

BRIEF SUMMARY OF THE INVENTION

It has been found that these problems can be substantially overcome if fuel flows to the outermost segment is blocked in a portion of the engine operating envelope at low total inlet temperatures below 24° F and engine burner pressures less than 120 psia. This is accomplished by providing a solenoid for blocking fuel flow to the outermost augmentor in this portion of the engine operating envelope.

When the engine is power limited, the thrust loss due to reduced augmentor fuel air ratio is regained by increasing the fan pressure ratio. This is accomplished by increasing the fuel flow to the main combustor and decreasing the exit nozzle area.

IN THE DRAWINGS

DETAILED DESCRIPTION OF THE INVENTION

Figure 1:
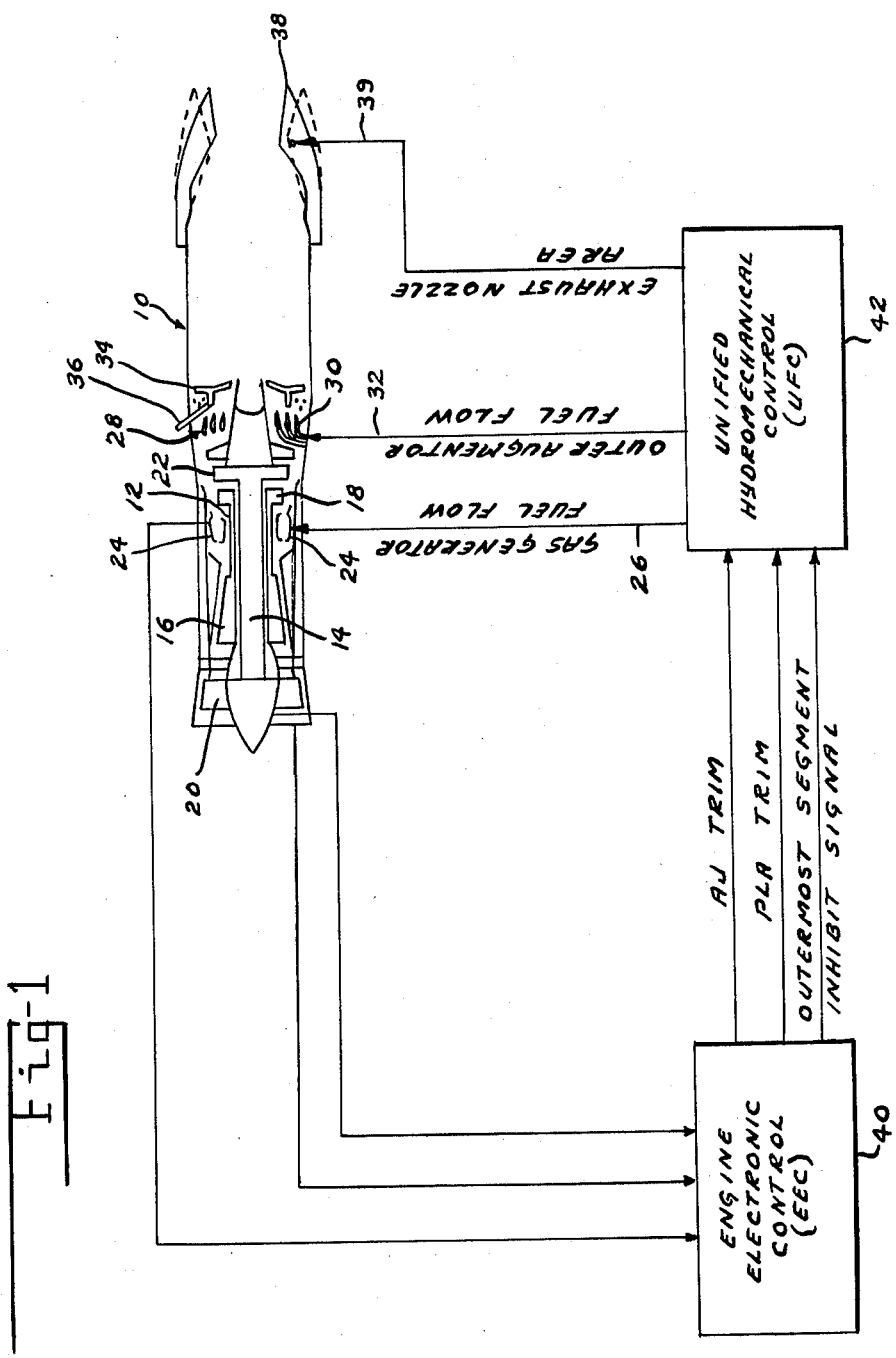
FIG. 1 is a schematic diagram partially in block form of a thrust augmented turbofan engine incorporating the present invention.

Reference is now made to FIG. 1 of the drawing which shows a typical twin spool turbine engine 10 having a high spool 12 and a low spool 14. The compressor 16 is connected to the high spool 12 and is driven by the turbine 18. A fan 20 is connected to the low spool 14 and is driven by turbine 22. A plurality of burners 24 have fuel supplied from line 26 and provide energy to drive turbines 18 and 22 in a conventional manner. A plural segment thrust augmentor 28 has fuel supplied to the outermost segment 30 through a fuel line 32. Similar fuel lines, not shown, supply fuel to the other augmentor segments. A conventional augmentor flameholder 34 and igniter 36 are positioned downstream of the augmentor 28. The gases which pass through the turbines and augmentor are expanded through a variable area nozzle 38 controlled by a conventional nozzle area adjustment indicated by line 39.

Present day turbojet engines have a plurality of controllable components to control the aircraft engines during their various modes of operation. Unified control systems are used which respond to a plurality of engine and flight parameters to produce control signals which regulate the engine. Electronic control, or a combination of electronic and hydromechanical control, has been used to provide control for the engine.

Since the present invention involves only a portion of the control, only those inputs and outputs from engine electronic control 40 and hydromechanical control 42 which are required to describe the invention will be shown, though other functions will normally be performed by the engine control system.

The engine electronic control of FIG. 1 shows inputs of engine inlet total temperature (TT2), a burner pressure PB input and a flight Mach number input all of which are shown in the cited patents to be conventional engine parameters used in engine control.

Figure 2:
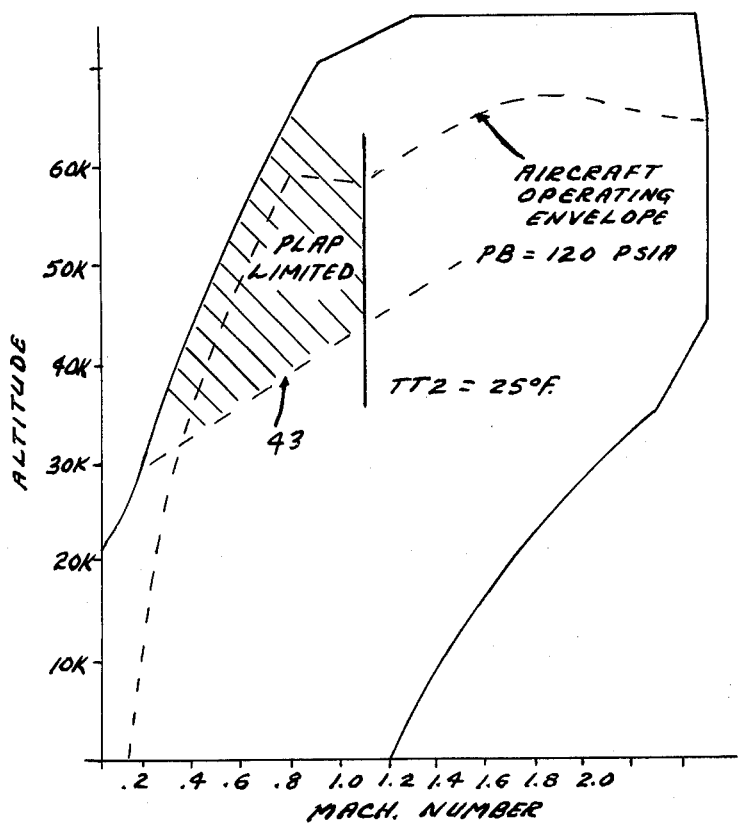
FIG. 2 is a graphical display showing the portion of the aircraft operating envelope for which the outer augmentor segment is blocked.

The engine electronic control supplies an outermost augmentor segment inhibit signal to the hydromechanical control 40 in addition to the AJ trim signal and the PLA trim signal during the portion of the aircraft operating envelope shown at 43 in FIG. 2.

The inlet total temperature signal TT2 is compared with a reference level signal $T_1$ in comparator 46 to supply a signal to OR/GATE logic circuit 48 when the engine inlet total temperature TT2 is less than 25° F.

The engine burner pressure signal PB is compared with a reference level signal $PB_1$ in comparator 50 to supply a signal to OR/GATE logic circuit 48 when the engine burner pressure is less than 120 psia. If a signal appears at either input 52 or 54 of the OR/GATE circuit 48, a signal is supplied to a solenoid 56 to inhibit the flow of fuel through the outermost augmentor segment fuel control 58. This may be accomplished either by closing the fuel line to the outermost augmentor segment or by providing a stop which prevents the augmentor sequence control system moving to the outermost augmentor segment position. The exact manner in which fuel flow to the outermost augmentor segment is blocked would be determined by the particular fuel control system.

Thrust loss, due to reduced augmentor fuel-air ratio as a result of blocking fuel flow to the outermost augmentor segment, can be regained by increasing the fuel flow to the engine burners 24 and by decreasing the area of exhaust nozzle 38.

When the OR/GATE output goes from low to high, the AJ reset circuit 62 supplies a signal to the nozzle trim circuit 64 to adjust the nozzle closed 8%. The positive going signal is also supplied to PLA reset circuit 66 which supplies a signal to the fuel trim control circuit 68 to reset the fuel power lever angle up 4 degrees.

A high to low signal from the OR/GATE 48 will cause the AJ reset circuit 62 to supply a signal to the nozzle trim circuit to adjust the nozzle open 8%. This signal will also cause PLA reset circuit 66 to supply a signal to fuel trim control circuit 68 to reset the fuel power level angle down 4 degrees.

While these changes have been shown in the engine electronic control 40, the particular manner of adjusting PLA trim and AJ trim would be different with different control systems. In some systems, the upmatch adjustment could be made in the unified hydromechanical control 42.

Figure 4:
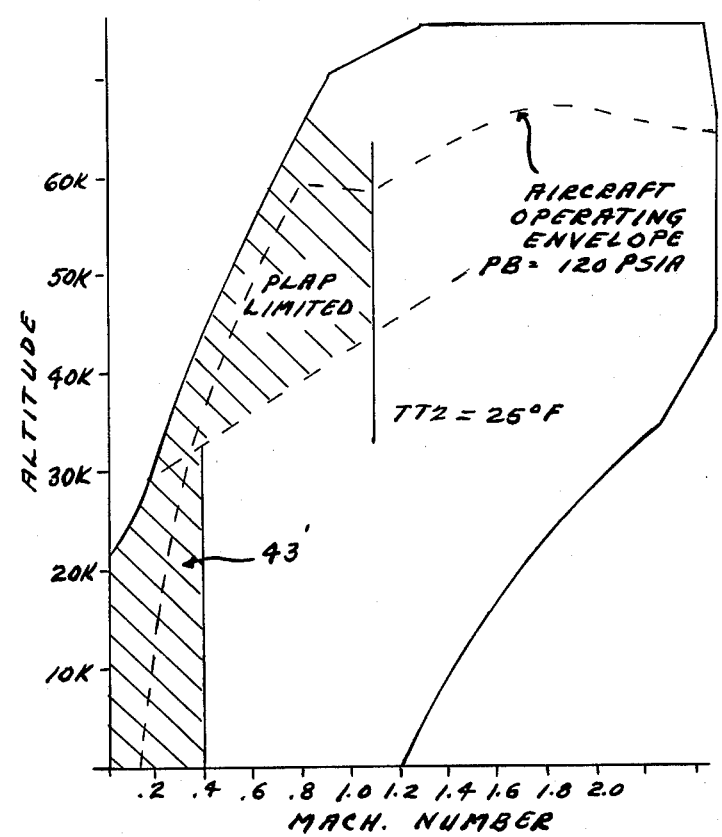
FIG. 4 is a graphical display showing a portion of the aircraft operating envelope for which the outer augmentor segment is blocked according to another embodiment of the invention.
Figure 3:
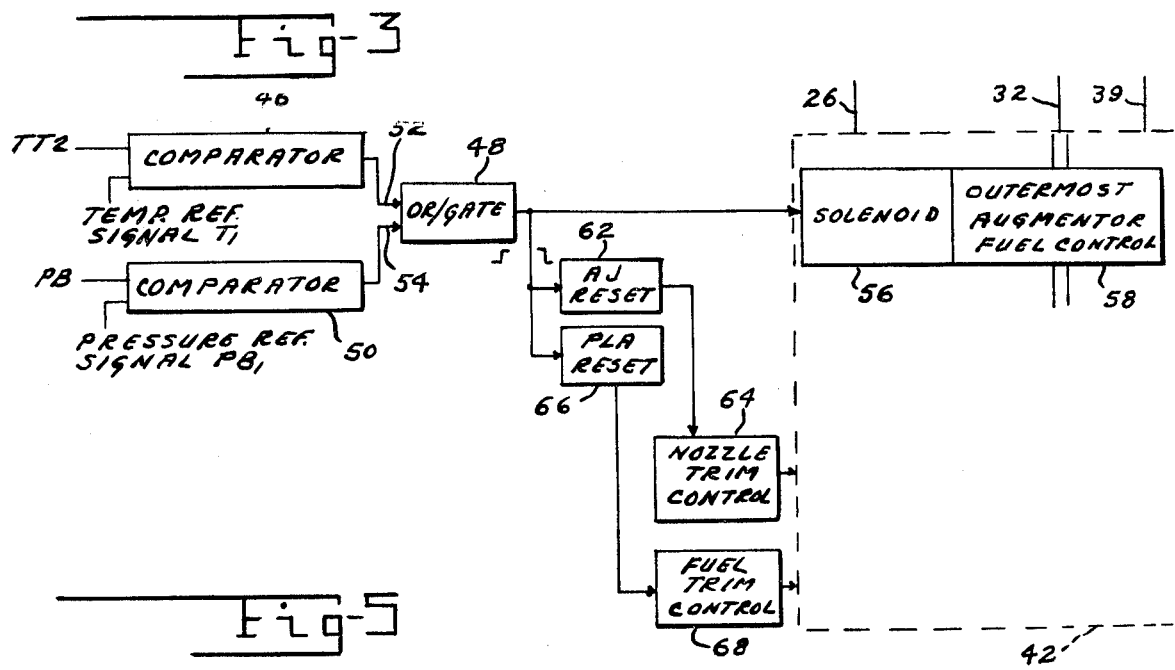
FIG. 3 is a schematic block diagram of a portion of the engine control for the device of FIG. 1.
Figure 5:
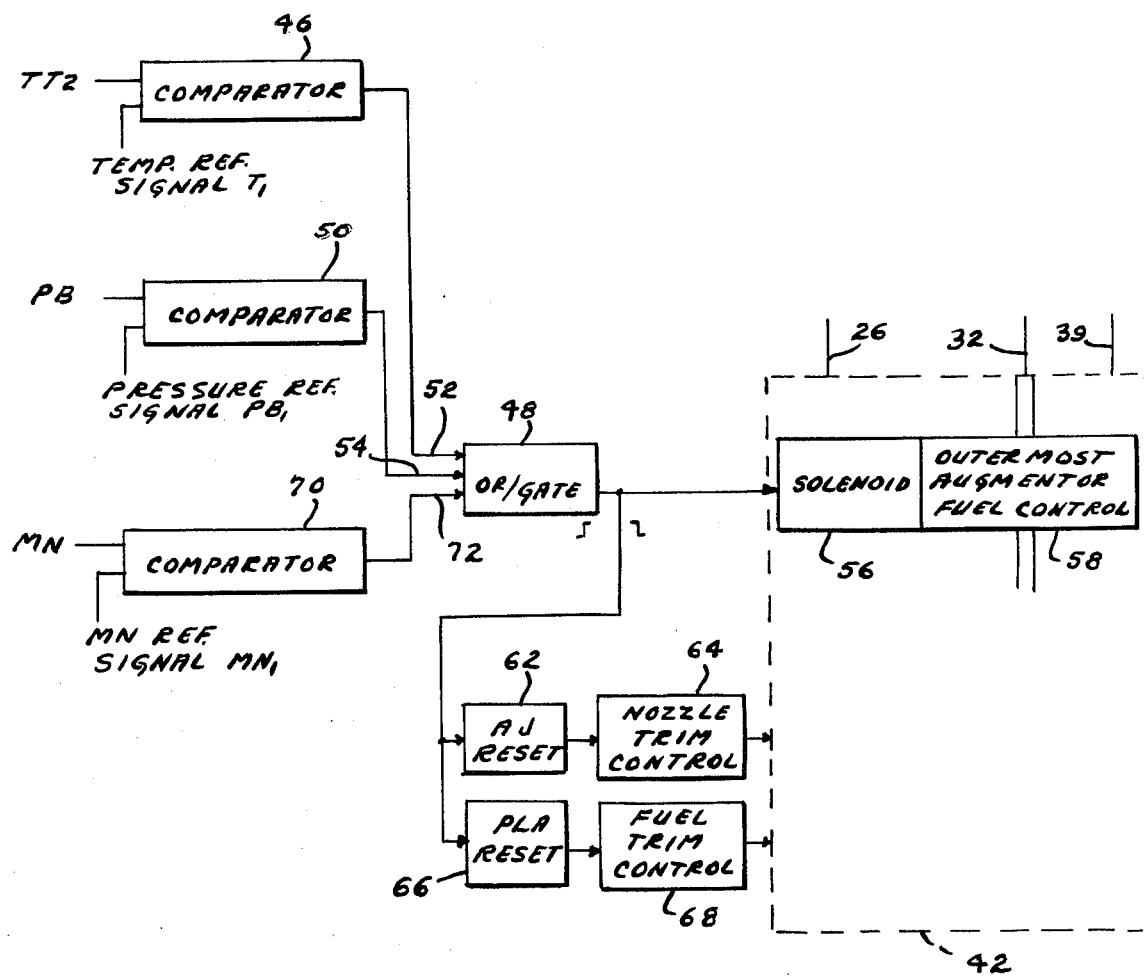
FIG. 5 is a modification of the device of FIG. 3 according to another embodiment of the invention.

It was found that instability at high altitudes could be overcome by blocking fuel flow to the outermost augmentor segment in the manner described with respect to FIGS. 2 and 3. To also overcome augmentor liner and nozzle distress at near sea level conditions, the outer augmentor segment is blocked in the additional area of the aircraft operating envelope shown at 43' in FIG. 4. This is accomplished in the manner shown in FIG. 5 wherein, in addition to the system shown in FIG. 3, a Mach number signal MN is compared with a Mach number reference level signal $MN_1$ in comparator 70 to supply a signal to OR/GATE logic circuit 48 when the Mach number is less than 0.4. If a signal appears at any of the inputs 52, 54 or 72 of circuit 48, a signal is supplied to solenoid 56. The remainder of the system operates in the manner described above.

There is thus provided a system for overcoming instability in an afterburner turbofan engine at high altitude, low Mach number conditions.

We claim:

1. In a control for a thrust augmented twin spool turbofan engine having compressor driven by a first turbine connected to one spool; a fan, adjacent the engine inlet, driven by a second turbine connected to a second spool, a plurality of burners for supplying energy to drive the first and second turbines, a plural segment augmentor down stream of said turbines; a variable area nozzle for expanding the gases passing through the turbines and thrust augmentor; a unified control system, including an engine electronic control and a unified hydromechanical control for controlling the engine during its various operating modes with the unified control including, means for controlling fuel flow to said burners, means for sequencing the fuel flow to separate segments in the augmentor and means for controlling the area of the variable nozzle; means for supplying a signal proportional to engine inlet total temperature to said unified electronic control; means for supplying a signal proportional to engine burner pressure to said unified electronic control; a system for controlling instability at high altitude low Mach conditions, comprising: means for blocking fuel flow to the outermost augmentor segment during a portion of the aircraft operating envelope when the engine inlet total temperature is less than a predetermined temperature and when the engine burner pressure is less than a predetermined pressure; means, for increasing the fan pressure ratio by increasing the fuel flow to the engine burners a predetermined amount and decreasing the variable nozzle area a predetermined percent during the time that the fuel flow to the outermost augmentor segment is blocked.

2. The system as recited in claim 1 wherein means for blocking fuel flow to the outermost augmentor segment includes means for blocking said flow when the inlet total temperature is less than 25° F and when said engine burner pressure is less than 120 psia.

3. The system as recited in claim 2 unified control system includes means for supplying a signal proportional to Mach number to said unified electronic control; said means for blocking fuel flow to the outermost augmentor segment includes means for blocking said fuel flow when the Mach number is less than 0.4.

4. A method for controlling instability at high altitude, low Mach number conditions in thrust augmented twin spool turbofan engine having compressor driven by a first turbine connected to one spool and a fan, adjacent an engine inlet, driven by a second turbine connected to a second spool, a plurality of burners for supplying energy to drive the first and second turbines, a variable area nozzle for expanding the gases passing through the turbines and thrust augmentor; a unified control system, including an engine electronic control and a unified hydromechanical control for controlling the engine during its various operating modes with the unified control including means for controlling fuel flow to said burners, means for sequencing the fuel flow to separate segments in the augmentor and means for controlling the area of the variable nozzle, comprising: the steps of blocking fuel flow to the outermost augmentor during a portion of the aircraft operating envelope when the engine inlet total temperature is less than 25° F and when the engine burner pressure is less than 120 psia; increasing the fan pressure ratio by increasing the fuel flow to the engine burners a predetermined amount and decreasing the variable nozzle area a predetermined percent during the time that the fuel flow to the outermost augmentor segment is blocked.

* * * * *